United States Patent
Covit

(10) Patent No.: US 7,040,088 B2
(45) Date of Patent: May 9, 2006

(54) DIESEL ENGINE EXHAUST PURIFICATION SYSTEM

(76) Inventor: Raymond Paul Covit, 673-20th St., #3, San Pedro, CA (US) 90731

( * ) Notice: Subject to any disclaimer, the term of this patent is extended or adjusted under 35 U.S.C. 154(b) by 0 days.

(21) Appl. No.: 10/673,700

(22) Filed: Sep. 29, 2003

(65) Prior Publication Data

US 2004/0118111 A1    Jun. 24, 2004

Related U.S. Application Data

(60) Provisional application No. 60/435,412, filed on Dec. 20, 2002.

(51) Int. Cl.
*F01N 3/10*    (2006.01)

(52) U.S. Cl. ............... 60/300; 60/274; 60/279; 60/289; 60/303; 60/320; 60/298

(58) Field of Classification Search .............. 60/274, 60/278, 287, 288, 279, 289, 298, 300, 303, 60/309, 320
See application file for complete search history.

(56) References Cited

U.S. PATENT DOCUMENTS

| | | | | |
|---|---|---|---|---|
| 4,651,524 A | * | 3/1987 | Brighton ................ | 60/274 |
| 4,858,431 A | * | 8/1989 | Leonhard et al. ........... | 60/297 |
| 5,320,523 A | * | 6/1994 | Stark ..................... | 431/353 |
| 5,417,059 A | * | 5/1995 | Hartel et al. ............... | 60/276 |
| 6,003,305 A | * | 12/1999 | Martin et al. .............. | 60/274 |
| 6,370,871 B1 | * | 4/2002 | Suzuki et al. .............. | 60/286 |

* cited by examiner

*Primary Examiner*—Binh Q. Tran

(57) ABSTRACT

An exhaust purification system for use with diesel or other compression ignited systems to remove particulate and gaseous pollutants from the exhaust. The system includes a catalytic converter assembly that heats the exhaust to a level sufficient to incinerate particulate pollutants in the exhaust prior to the pollutants contacting the catalytic element and a plurality of gas cooling elements communicating with the exhaust outlet in the catalytic converter assembly for reducing the temperature of the exhaust passing from that assembly to about 100° F. whereupon the cooled exhaust is directed back to the engine for further combustion.

58 Claims, 4 Drawing Sheets

DIESEL ENGINE EXHAUST PURIFICATION SYSTEM

This application claims the benefit of U.S. Provisional Patent Application Ser. No. 60/435,412, filed Dec. 20, 2002.

BACKGROUND OF THE INVENTION

The present invention relates to an engine exhaust purification system for conventional diesel engines which substantially reduces the particulate matter, hydrocarbons, carbon monoxide, carbon dioxide and other polluting gases, in the exhaust stream. Diesel engines are well known for their polluting exhausts which contain substantially larger particulate matter and more noxious gases than their gasoline-powered counterparts. While many advances have been made in both diesel engines and gasoline fueled internal combustion engines to improve the quality of their exhausts, most diesel engines have not benefited from the use of catalytic converters. A catalytic converter acts to break up hydrocarbons and oxides of nitrogen and other gases in the exhaust into their simpler compounds, providing cleaner emissions. However, when used with diesel engines, catalytic converters rapidly fail due to the buildup of particulate residue thereon which inhibits the catalytic reaction. It would be highly desirable if this residue problem could be overcome so that catalytic converters could be effectively used with diesel engines which would significantly improve their exhaust omissions. The present invention obtains that result.

SUMMARY OF THE INVENTION

Briefly, the present invention comprises an exhaust purification system for diesel engines wherein the exhaust gas is passed over a heating element that raises the temperature of the gas to about 500° to 750° Fahrenheit to ignite and substantially incinerate a significant percentage of the particulate matter and other flammables therein such as soot, hydrocarbons, aldehydes, and other gases prior to the exhaust impinging on the oxidizing catalytic bed. The heating element utilizes spark plug to ionize the adjacent air and ignite a gaseous fuel, preferably comprised of a mixture propane and air, that is directed under pressure through a foraminous ceramic block to generate infrared heat and provides a plurality of open flames along the surface of the ceramic block that facilitate ignition of the flammable gases within the engine exhaust and the additional heat assists in the incineration of other exhaust constituents. The heated exhaust gases are then passed over the oxidizing catalytic bed and are broken down as in the use of a conventional catalytic converter in a gasoline powered automobile. The amount of the heat supplied to the exhaust by the heating element will vary under varying conditions but is continually adequate to maintain the catalytic bed at a temperature sufficient to support the catalytic function as the heat in a diesel engine exhaust, by itself, is generally inadequate to do so. The gas exiting the catalytic chamber of the present invention is oxygen-rich and can be exhausted into the atmosphere with a substantially reduced level of pollutants. More preferably, however, the exhaust is maintained in a substantially closed system in which the treated exhaust is directed through a series of coolers and collectors that substantially cool the exhaust gas, cause the water vapor therein to condense and extract the water and contaminants carried thereby from the gas flow. The cooled and purified exhaust gas is then directed back into the intake of the diesel engine.

Under high demand loads on the engine or during variable speed operation, it may be necessary to support the combustion by augmenting the cooled and purified exhaust flow with oxygen. Accordingly, inlet and outlet valves are upstream of the engine air intake to supplement the treated exhaust gas with ambient air and discharge a corresponding volume of exhaust gas to the atmosphere. In addition, by controlling the oxygen content in the reentry exhaust available to support combustion, the combustion temperature within the engine can be maintained below about 2100° F. to virtually eliminate the formation and discharge of NOX.

It is the principal object of the prevent invention to provide a system for reducing the pollutants in the exhaust of a diesel engine. This and other objects and advantages of the present invention will become readily apparent from the following detailed description taken in conjunction with the accompanying drawings.

DETAILED DESCRIPTION OF THE PREFERRED EMBODIMENTS

Referring now in detail to the drawings, the exhaust purification system 10 of the present invention is specifically adapted for use with a diesel engine 12. While it is believed that the present invention would be readily adaptable for use with other compression ignited engines, the following description will be with reference to diesel engines as diesel engines are currently its primary application. It is to be understood, however, that the invention is not so limited.

Figure 1:
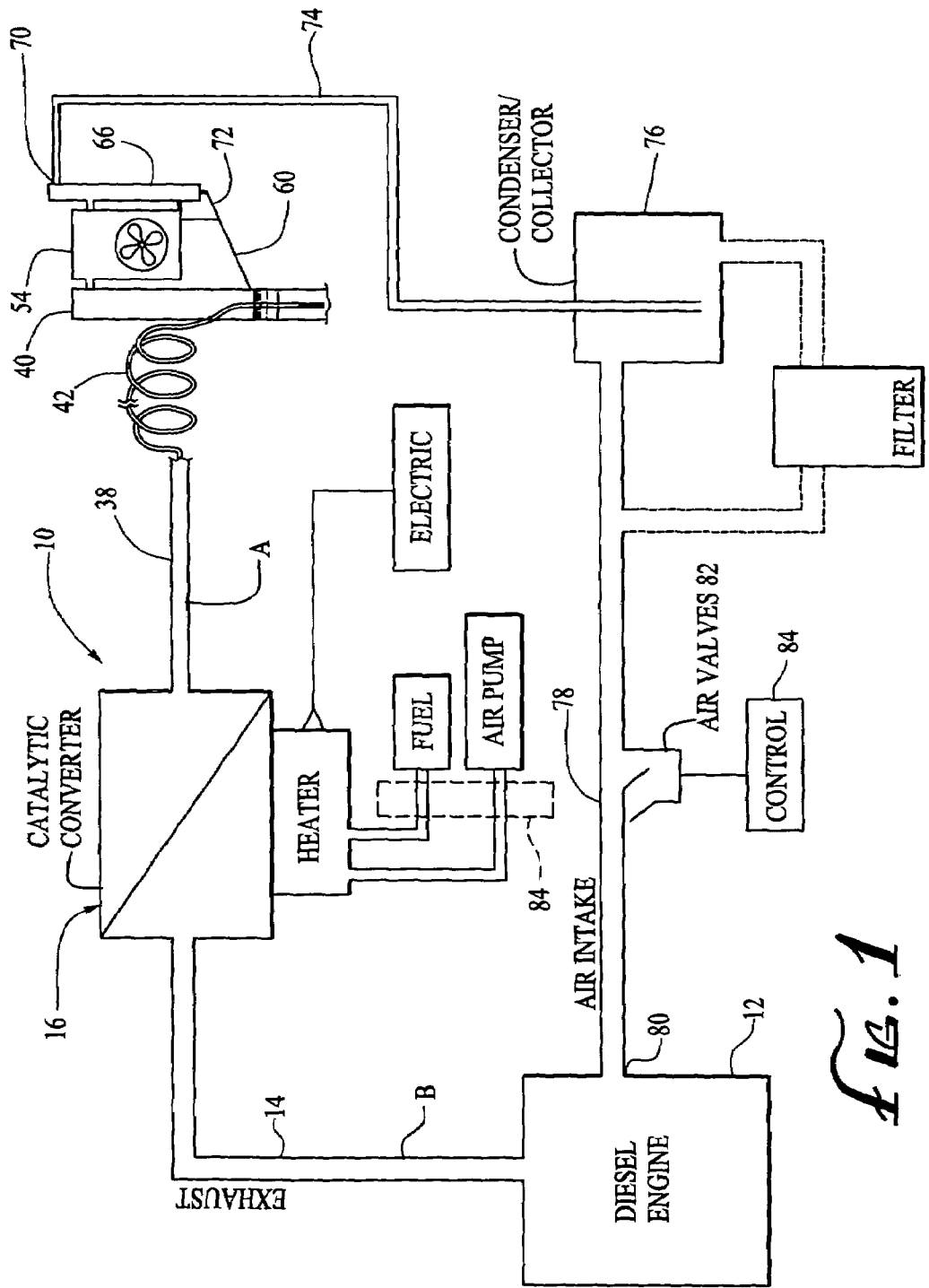
FIG. 1 is a schematic representation of the preferred embodiment of the diesel engine exhaust purification system of the present invention.
Figure 2:
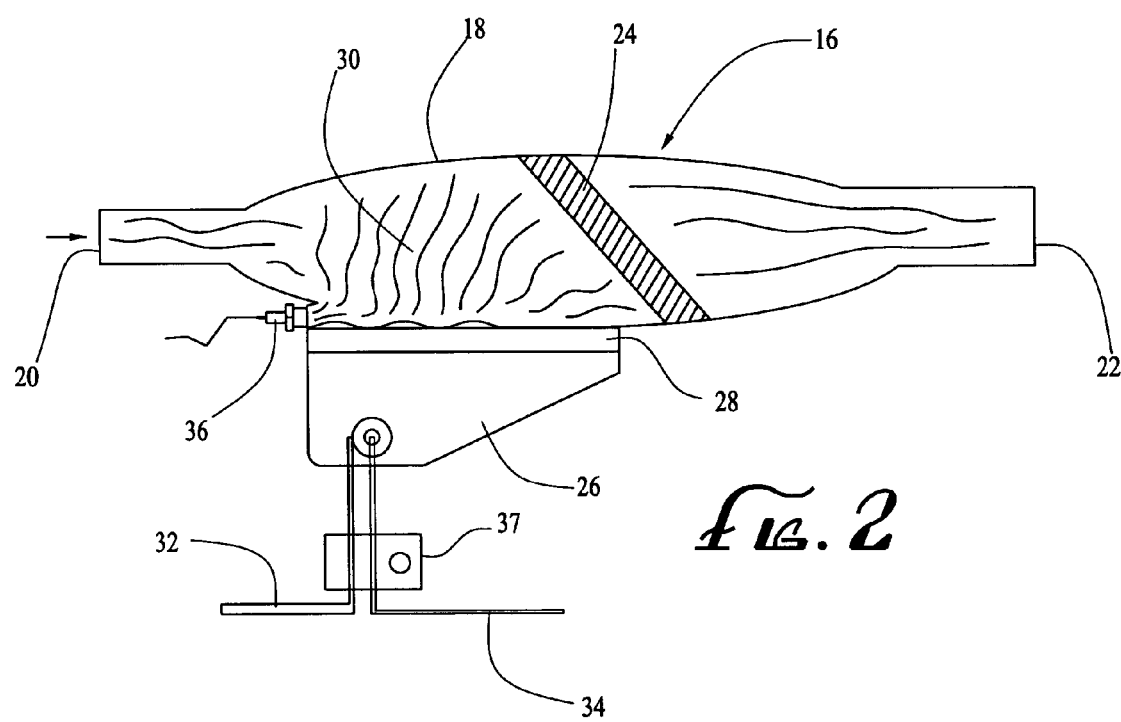
FIG. 2 is a schematic representation of the preferred embodiment of the catalytic converter assembly of the present invention.

As seen in FIG. 1, the exhaust from the engine 12 is directed via conduit 14 to the catalytic converter assembly 16, the preferred embodiment of which is schematically illustrated in more detail in FIG. 2. As seen therein, the assembly 16 includes a housing 18 defining an exhaust inlet 20 in its upstream end and an exhaust outlet 22 in its downstream end. A catalytic bed 24 is disposed within and extends across housing 18 as in a conventional catalytic converter. While it is believed that different types of catalytic converters may be successfully employed in the present invention, the catalytic bed 24 that successfully produced the test results set forth below is comprised of small pellets containing palladium oxide (approximately 3 mm. in diameter) and was used in catalytic converters by General Motors' automobiles from about 1975–1993.

A mixing chamber 26 is disposed below and communicates with an upstream portion of the interior area of housing 18 through a foraminous block 28 preferably formed of a ceramic material. Block 28 is of the type employed in gas-fired, flat panel, infrared space heaters. Specifically, the ceramic block 28 successfully employed in the present invention was approximately 1.5 inches thick, 8 inches long by 4 inches wide and taken from a portable heater, Model No. P-16T, manufactured by Detroit Radiant Products Company located in Warren, Mich., and identified in the Grainger catalog 394 as Item 2E392. Block 28 defines a large number of small honeycomb passageways therein so as to allow for the relatively uniform passage of gas therethrough from the mixing chamber 26 into a combustion chamber 30 defined by the upstream interior portion of housing 18. Block 28 may be formed of other flame-resistant materials defining or being formed to define gas passageways extending therethrough that are configured to prevent flame transfer back into the mixing chamber and preferably additionally configured to generate infrared wave patterns as provided by ceramic material in block 28.

Pressurized sources of fresh air and a fuel, preferably propane, communicate with the mixing chamber 26 via conduits 32 and 34, respectively. Natural gas and other fuels might also be utilized. An igniter device 36, preferably an electrically activated spark plug, is provided within the combustion chamber 30 adjacent ceramic block 28. Upon directing fuel and air into the mixing chamber 26 and the mixed gas passing through the ceramic block into combustion chamber 30, activation of the igniter 36 will cause the fuel and air mixture to ignite in the bottom of the mixing chamber, heating the ceramic block to incandescence which radiates infrared heat into the combustion chamber 30 within housing 18. The use of a spark plug in the igniter device will ionize the adjacent air which is believed to assist in the reduction of hydrocarbons and allows for the possible periodic shutting off of the propane or other fuel to the mixing chamber, as will be later described.

The flow of air and fuel to and through the mixing chamber is preferably regulated by a demand/control mechanism 37 to regulate the temperature within chamber 30. This enables one to quickly bring chamber 30 up to or slightly above the catalytic activation temperature prior to starting the engine and thereafter to vary the temperature, if needed, in response to changes in operating conditions. For example, once the catalytic converter assembly 16 is operative with the engine running and the catalyst activated, it may not be necessary to continue to provide propane to the mixing chamber as the assembly 16 has been found to effectively feed off the pollution in the engine exhaust to maintain the flame at the ceramic block 28. With newer and cleaner burning diesel engines, it may be necessary to at least periodically provide a flow of propane to the mixing chamber to maintain the flame in the combustion chamber. Under certain conditions and/or applications, the flames need not be maintained once the chamber has been bought up to temperature and the catalytic action initiated. With the temperature over about 750° F. and sufficient pollutants in the exhaust to fuel the catalytic reaction, un-ignited propane may be directed to the catalytic bed to reduce NOX as the propane will react with NOX with a palladium catalyst. Also, the introduction of un-ignited propane helps maintain the catalytic reaction without a flame. Other similar fuels, such as methane or butane, may also be used.

While a minimum temperature of about 575° F. is necessary to initiate a catalytic reaction, depending, of course, on the catalyst employed, the above-described heater configuration efficiently raises the temperature within combustion chamber 30 to a more preferable level of about 750° F. It also provides a large number of small flames within the lower end of the combustion chamber adjacent ceramic block 28 where the air and propane mixture flows through the perforations therein. These flames not only provide an efficient and effective heat source but are highly wind resistant and thus not readily extinguished by the exhaust gases passing rapidly therethrough. It has been found that the combination of the flame and the generated heat in chamber 30 will also ignite the aldehydes and alcohols in the exhaust stream, generating additional heat and incinerating a significant percentage of the particulate matter and other flammables in the exhaust such as soot, hydrocarbons and other gases prior to the exhaust impinging on the oxidizing catalytic bed 24. As a result, the catalytic bed is not clogged with particulate residue as would be the case if the diesel exhaust were directed through a conventional catalytic converter.

As the heated exhaust flows through the catalytic bed 24, the conventional catalytic action occurs, raising the temperature at the reaction surface to over 1,000° F. and breaking up the unburned hydrocarbons and oxides of nitrogen in the exhaust into simpler non-polluting compounds. The cleansed exhaust then exits the assembly 16 through the outlet opening 22. While other heating elements could undoubtedly be employed in the present invention, the above-described elements combine to efficiently provide the desired heat within the combustion chamber, provide wind-resistant flames for facilitating the ignition of the aldehydes and alcohols in the exhaust, while the ceramic block 28 effectively prevents the flame from being drawn back into the mixing chamber 26.

Using a 1986 Chevrolet Series 60 flatbed truck with a Caterpillar/Allison Cat No. 34086, 8.2 Liter, V-8 Diesel in a 24,500 pound CVW Chassis, the following readings on the treated exhaust were recorded in an open system downstream of the catalytic converter assembly 16 at a location corresponding to Point A in the closed system illustrated in FIG. 1 under idle and full throttle conditions:

| Gas | IDLE: Reading | FULL THROTTLE*: Reading |
|---|---|---|
| HC | 27 ppm (parts per million) | 33 ppm |
| CO | 0.03% | 0.09% |
| $CO_2$ | 1.4% | 3.8% |
| $O_2$ | 18.5% | 15.2% |
| NO(X) | 317 ppm | 406 ppm |
| P.E.F. | 0.473 | 0.473 |

*Measured under no load conditions (neutral gear) at or slightly below redline (rpm's).

The following readings were taken for the untreated diesel exhaust at Point B in FIG. 1 and for the ambient air at the location where the tests were conducted:

| UNTREATED DIESEL EXHAUST AT IDLE: | | TYPICAL AMBIENT AIR: | |
|---|---|---|---|
| Gas | Reading | Gas | Reading |
| HC | 230 parts per million | HC | 0–15 parts per million |
| CO | 1% | CO | <.1% |
| $CO_2$ | 6% | $CO_2$ | <.1% |
| $O_2$ | 12%–14% | $O_2$ | 20.9% |
| NO(X) | 400 ppm | NO(X) | 0 ppm |

Thus, it can be seen from the above data that the quality of the treated diesel exhaust is significantly improved from the untreated exhaust and compares favorably with the contaminant content of ambient air. In addition, the oxygen contents in the purified exhaust ranges from about 15% to 19% as compared with 12%–14% in the untreated exhaust.

Figure 3:
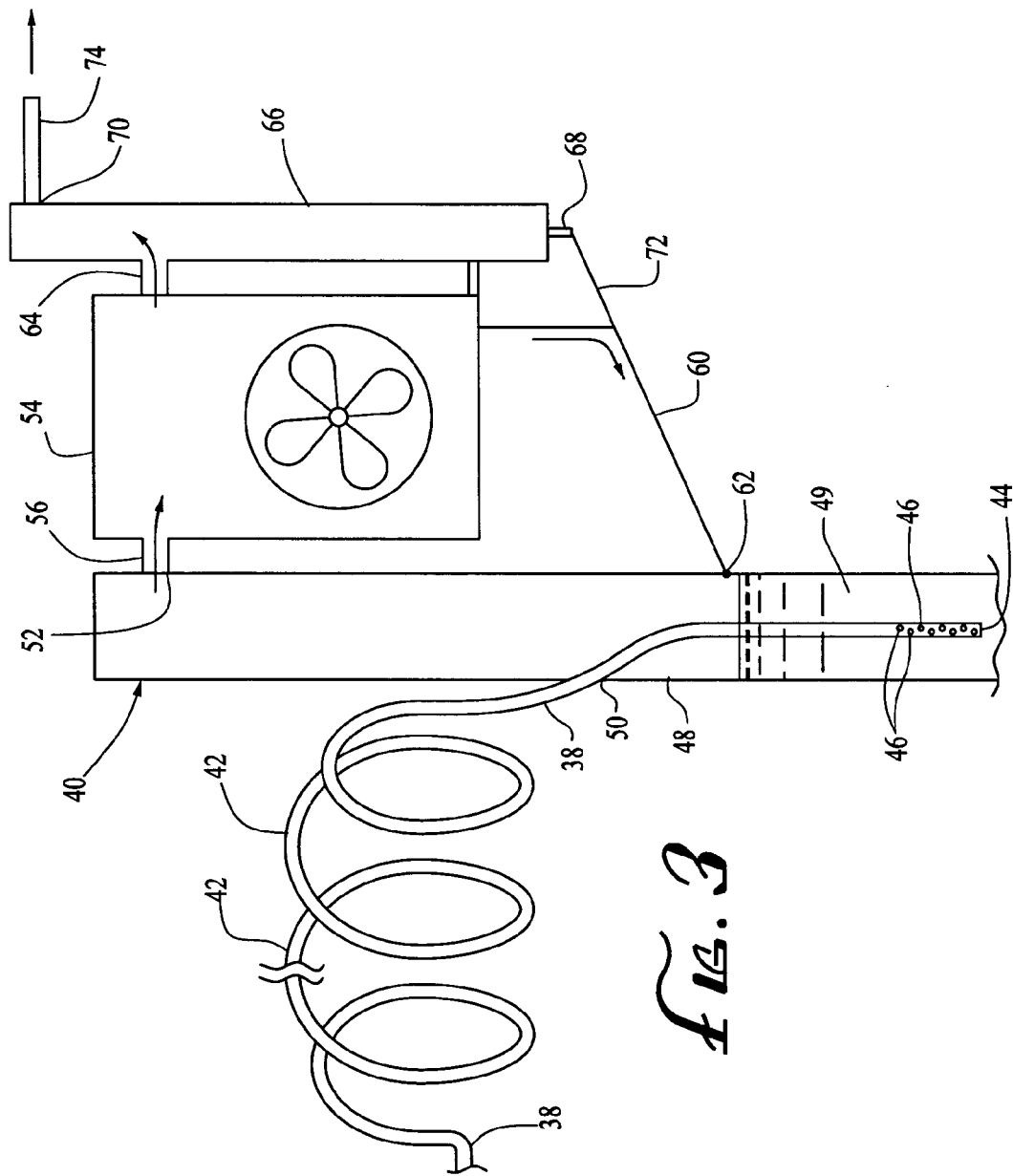
FIG. 3 is an enlarged partially schematic representation of a portion of the exhaust purification system of the present invention showing the cooling and filtering of the exhaust.

While the exhaust gas exiting the catalytic converter assembly 16 at outlet 22 represents a substantial improvement, the oxygen-rich gas need not be exhausted to the atmosphere. More preferably, it is maintained, or largely maintained, in the substantially closed purification system 10 (see FIG. 1) wherein the treated exhaust is directed via a cooling conduit 38 to a water filter 40. Conduit 38 can be formed of thin metal tubing defining a plurality of coils 42, a closed end 44 and a plurality of gas outlet apertures 46 adjacent end 44 for the release of the treated exhaust gas passing through conduit 38 into the water filter 40. The exhaust outlet apertures are preferably sized so as to collectively define an outlet area approximately equal to the area of the cross-section of conduit 38 so as not to induce a significant pressure drop throughout system 10. The dimensional parameters of cooling conduit 38 will vary for different applications. In one embodiment (shown in FIGS. 1 and 3), conduit 38 was formed of steel tubing, approximately 1.5 inches in diameter and 20 feet in linear length so as to define six 16-inch diameter coils 42 between the catalytic converter assembly 16 and the water filter 40.

The water filter 40 comprises a housing 48 having an opening 50 therein through which a downstream end portion of the cooling conduit 38 extends. A gas outlet 52 is provided proximate the upper end of the housing for the passage of the filtered exhaust gas to a cooler 54 via conduit 56. An annular seal 58 is carried by the water filter housing 48 about cooling conduit 38 to provide an airtight seal therebetween. The lower portion of housing 48 through which the downstream end of cooling conduit 38 extends is filled with water 49 preferably containing a relatively small amount of iron oxide. As the treated exhaust gas passes through cooling conduit 38 and exits the conduit through gas outlet apertures 46, the gas bubbles upwardly through the water and iron oxide in the water filter 40. As the gas exits the multiple apertures 46, as opposed to an open-ended tube, the surface contact area of the gas and the water and iron oxide is significantly increased, enhancing the filtration process. The iron oxide in the water effectively traps the sulfur compounds in the gas within the water as the gas passes therethrough and into conduit 56. A conduit 60 is provided in the lower end of cooler 54 to return condensed water vapor from cooler 54 to the water filter 40. An anti-siphon valve 62 is included in conduit 60 to prevent fluid flow from the water filter 40 to the cooler 54.

Cooler 54 is of a conventional radiator type and effects a further cooling of the exhaust gases therein as a result of the expansion of the exhaust gas as it passes therethrough and the dissipation of heat through the multiple radiator fins (not shown) employed therein. The cooled gas then passes from cooler 54 through conduit 64 into a water trap separator 66. The water trap separator 66 can be comprised of a hollow pipe having a water drain 68 at its lower end and a gas outlet 70 at its upper end. As the cooled exhaust gas passes from conduit 64 into the water trap separator 66, the gas further expands, creating additional cooling of the gas and condensation of remaining water vapor. A condensation drain line 72 communicates the water outlet in separator 66 with the lower end of water filter 40 via conduit 60. Upon exiting the water trap separator 66 through outlet 70, the exhaust gas is directed through conduit 74 to a second cooler 76 wherein the exhaust gas is cooled further and any remaining moisture extracted. From cooler 76, the gas is directed via conduit 78 to the air intake 80 of the diesel engine 12.

As the treated exhaust gas is directed from the catalytic converter assembly 16 and through the remainder of system 10, the temperature of the exhaust gas is reduced from about 1000° F.–1500° F. to approximately 100° F. whereupon the oxygen-rich cooled gas can be effectively reintroduced to the diesel engine in a closed system, minimizing the exhaust of any pollutants to the atmosphere. However, as the exhaust gas purified by system 10 of the present invention still has an oxygen content of about 18% and a diesel engine operating under higher demand loads or during variable speed conditions may have air intake demands of up to about 20% oxygen, it may be necessary to support combustion within the engine by augmenting the exhaust flow with additional outside air during such operating conditions prior to the flow entering the engine air intake. Accordingly, system 10 is provided with valving mechanisms 82 by which supplemental ambient air can be directed into the exhaust gases upstream of the engine air intake and, if necessary, exhaust can be released to the atmosphere, which may or may not be equal in volume to the added air. As indicated above, any such exhausted air has been substantially purified by the present invention. At idle, when no power is required, the system has been successfully operated in a completely closed situation in which virtually all of the purified exhaust is directed back to the engine intake. Curiously, however, it has been found that in a substantially closed system, as above described, the total mass of exhaust contaminants discharged to the atmosphere has been found to be reduced by at least about 99% as compared to the amount of untreated exhaust discharged in a conventional system. Thus, due to such a volume of reduction in exhaust gas, the total amount of CO, $CO_2$ and other pollutants released into the atmosphere is significantly reduced with the present invention.

In system 10, a computerized control 84 could be employed for regulating the intake and exhaust valve mechanisms 82 in response to varying engine demands of oxygen. By utilizing the valve control 84 so as to minimize the supplemental oxygen introduced through valve mechanism 82 to the level necessary to sustain combustion, the combustion temperature of the engine 12 can be maintained to a level below about 2100° F., which prevents or substantially limits the formation of NOX in the exhaust, further enhancing the performance of the system. NOX reduction to levels of about 0–40 ppm have been observed.

Figure 4:
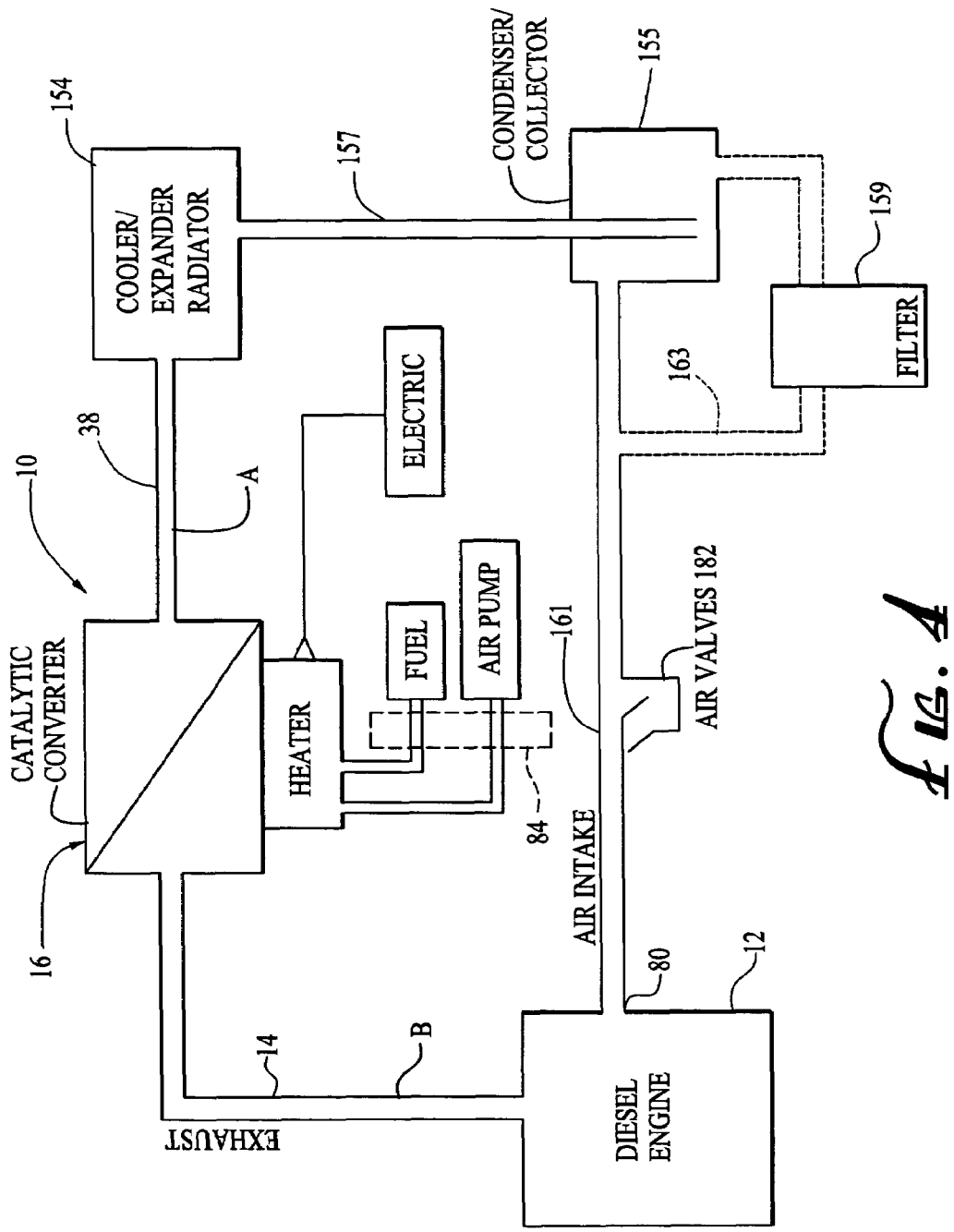
FIG. 4 is a schematic representation of an alternate embodiment of the engine purification system of the present invention.

While the above-described system 10 embodies the preferred embodiment of the present invention, it is to be understood that other filter/cooler combinations could be employed in the purification system of the present invention to remove unburned carbon particulates, water and other gases trapped therein from the exhaust gas and to lower the temperature of the exhaust gas such that it can be effectively recycled in a closed or substantially closed system as described above. For example, a modified system is illustrated in FIG. 4 wherein the exhaust gas is directed from the catalytic converter assembly 16 to a cooler 154 similar in configuration to coolers 54 and 76 in the above described embodiment, and from cooler 154 to a condenser/collector 155 via conduit 157. The condenser/collector 155 collects the condensation removed from the exhaust gas by the cooler 154 and directs the gas to the air intake of the diesel engine via computer controlled air valves 182. The condensation and any particulate matter collected therein is directed from the condenser/collector 155 to a reverse osmosis or other mechanical filter 159 where the liquid and particulate matter remaining in the system are separated and collected for removal from the system and the gas passing therethrough could be redirected to conduit 161 via conduit 163 for delivery to the engine intake. One or more additional coolers and collectors could also be employed in the exhaust loop.

It is to be understood that other modifications in the cooling and filtering processes could also be employed to cool the gas flow passing from the catalytic converter assembly 16 and remove unburned particulate matter, water vapor and other gaseous pollutants therefrom. Insofar as those and other changes and modifications are within the purview of the appended claims, they are to be considered as part of the present invention.

What is claimed is:

1. A catalytic converter assembly for use in an exhaust purification system for a diesel or other compression ignited engine to remove particulate and gaseous pollutants therefrom, said assembly comprising:
   a housing defining an exhaust inlet and an exhaust outlet, said housing having a first chamber and a second chamber;
   an catalytic element disposed within said second chamber of said housing between said inlet and said outlet such that upon communicating said inlet with the engine exhaust, the exhaust passes through said housing, through said first chamber and through said second chamber about said catalytic element therein; and
   a heating assembly situated in said first chamber of said housing for heating exhaust gases flowing therethrough between said inlet and said second chamber, said heating assembly operative to heat the exhaust to a temperature sufficient to initiate a catalytic reaction between the exhaust and said catalytic element and to incinerate particulate pollutants in the exhaust prior to said particulate pollutants contacting said catalytic element.

2. The catalytic converter assembly of claim 1 wherein said heating assembly provides one or more flames within said housing for igniting gaseous pollutants in the exhaust and raising the temperature in said housing between said inlet and said catalytic element to enhance the efficiency of said heating element; and wherein said heating assembly is operative to heat the exhaust in said first chamber and said second chamber to a temperature no greater than the maximum operating temperature of the catalytic element.

3. The catalytic converter assembly of claim 1 wherein said catalytic element comprises pellets containing palladium.

4. The catalytic converter assembly of claim 1 wherein said heating assembly heats said exhaust to a temperature of at least about 575° F.

5. The catalytic converter assembly of claim 1 wherein said heating assembly heats said exhaust to a temperature of at least about 750° F.

6. A catalytic converter assembly for use in an exhaust purification system for a diesel or other compression ignited engine to remove particulate and gaseous pollutants therefrom, said assembly comprising:
   a housing defining an exhaust inlet and an exhaust outlet;
   an catalytic element disposed within said housing between said inlet and said outlet such that upon communicating said inlet with the engine exhaust, the exhaust passes through said housing about said catalytic element;
   a heating assembly associated with said housing for heating the exhaust flowing through said housing between said inlet and said catalytic element to a temperature sufficient to initiate a catalytic reaction between the exhaust and said catalytic element and to incinerate particulate pollutants in the exhaust prior to said particulate pollutants contacting said catalytic element;
   wherein said heating assembly includes an infrared heat generating element formed of foraminous material defining a plurality of small passageways therein communicating with an interior portion of said housing between said exhaust inlet and said catalytic element, a pressurized source of fuel communicating with said interior portion of said housing through said passageways and an igniter proximate said heat generating element for igniting the fuel passing therethrough.

7. The catalytic converter assembly of claim 6 wherein said fuel comprises propane and said igniter includes a spark plug and means for activating said spark plug.

8. The catalytic converter assembly of claim 6 wherein said passageways are configured to generate infrared wave patterns.

9. A catalytic converter assembly for use in an exhaust purification system for a diesel or other compression ignited engine to remove particulate and gaseous pollutants therefrom, said assembly comprising
   a housing defining an exhaust inlet and an exhaust outlet;
   an catalytic element disposed within said housing between said inlet and said outlet such that upon communicating said inlet with the engine exhaust, the exhaust passes through said housing about said catalytic element;
   a heating assembly associated with said housing for heating the exhaust flowing through said housing between said inlet and said catalytic element to a temperature sufficient to initiate a catalytic reaction between the exhaust and said catalytic element and to incinerate particulate pollutants in the exhaust prior to said particulate pollutants contacting said catalytic element;
   wherein said housing defines a combustion chamber therein between said exhaust inlet and said catalytic element and wherein said heating assembly comprises a mixing chamber, a block of foraminous material disposed between said mixing chamber and said combustion chamber, said foraminous material defining a plurality of passageways therein communicating said mixing chamber with said combustion chamber through said block, a fuel inlet adapted to communicate a pressurized source of fuel with said mixing chamber, an air inlet adapted to communicate a pressurized source of air with said mixing chamber, a controller for regulating the air and/or fuel flow into said mixing chamber and an igniter disposed within said housing proximate said block of foraminous material for igniting a fuel and air mixture flowing into said combustion chamber from said mixing chamber through said block whereby the temperature within said combustion chamber is heated to a temperature of at least about 575° F.

10. The catalytic converter assembly of claim 6 wherein said heating assembly heats said interior portion of said housing to a temperature of at least about 575° F.

11. The catalytic converter assembly of claim 6 wherein said heating assembly heats said interior portion of said housing to a temperature of at least about 750° F.

12. The catalytic converter assembly of claim 6 wherein said catalytic element comprises pellets containing palladium.

13. The catalytic converter assembly of claim 9 wherein said temperature in said combustion chamber is elevated by said heating assembly to at least about 750° F.

14. The catalytic converter assembly of claim 9 wherein said foraminous material is ceramic and said catalytic element comprises pellets containing palladium.

15. The catalytic converter assembly of claim 9 wherein said heater assembly provides one or more flames within said combustion assembly for igniting gaseous pollutants in the exhaust and raising the temperature in said housing between said inlet and said catalytic element to enhance the efficiency of said heating assembly.

16. The catalytic converter assembly of claim 9 wherein said controller is adapted to be operatively coupled to the engine and is responsive to changes in the operating conditions of the engine to vary the air and/or fuel flow into said mixing chamber whereby the temperature within said combustion chamber can be varied in response to said operating conditions.

17. The catalytic converter assembly of claim 9 wherein said foraminous material is ceramic.

18. The catalytic converter assembly of claim 9 wherein said passageways are configured to generate infrared wave patterns.

19. The catalytic converter assembly of claim 9 wherein said foraminous material is ceramic and said passageways are configured to generate infrared wave patterns.

20. The catalytic converter assembly of claim 10 wherein said catalytic element comprises pellets containing palladium oxide.

21. The catalytic converter assembly of claim 15 wherein said temperature in said combustion chamber is elevated by said heating assembly to at least about 750° F.

22. A catalytic converter assembly for use in an exhaust purification system for a diesel or other compression ignited engine to remove particulate and gaseous pollutants therefrom, said assembly comprising:
a housing defining an exhaust inlet and an exhaust outlet;
an oxidizing catalytic element comprised of palladium disposed within and extending across said housing between said inlet and said outlet such that upon communicating said inlet with the engine exhaust, the exhaust passes through said housing about said catalytic element; and
a heating assembly situated in said housing providing one or more flames within said housing for igniting gaseous pollutants in the exhaust between said inlet and said catalytic element and heating the exhaust between said inlet and said catalytic element to a temperature sufficient to initiate a catalytic reaction between the exhaust and said catalytic element and to incinerate particulate pollutants in the exhaust prior to said particulate pollutants contacting said catalytic element; and wherein said heating assembly is operative to heat the exhaust in said housing to a temperature no greater than the maximum operating temperature of the catalytic element.

23. A catalytic converter assembly for use in an exhaust purification system for a diesel or other compression ignited engine to remove particulate and gaseous pollutants therefrom, said assembly comprising
a housing defining an exhaust inlet and an exhaust outlet;
an oxidizing catalytic element comprised of palladium disposed within and extending across said housing between said inlet and said outlet such that upon communicating said inlet with the engine exhaust, the exhaust passes through said housing about said catalytic element;
a heating assembly associated with said housing providing one or more flames within said housing for igniting gaseous pollutants in the exhaust between said inlet and said catalytic element and heating the exhaust between said inlet and said catalytic element to a temperature sufficient to initiate a catalytic reaction between the exhaust and said catalytic element and to incinerate particulate pollutants in the exhaust prior to said particulate pollutants contacting said catalytic element;
wherein said heating assembly includes an infrared heat generating element formed of a foraminous material defining a plurality of small passageways therein communicating with an interior portion of said housing between said exhaust inlet and said catalytic element, a pressurized source of fuel communicating with said interior portion of said housing through said passageways and an igniter proximate said heat generating element for igniting the fuel passing therethrough.

24. The catalytic converter assembly of claim 23 wherein said housing defines a combustion chamber therein between said exhaust inlet and said catalytic element and wherein said heating assembly comprises a mixing chamber, a block of ceramic material disposed between said mixing chamber and said combustion chamber, said ceramic material defining a plurality of passageways therein communicating said mixing chamber with said combustion chamber through said block, a fuel inlet adapted to communicate a pressurized source of fuel with said mixing chamber, an air inlet adapted to communicate a pressurized source of air with said mixing chamber, a controller for regulating the air and/or fuel flow into said mixing chamber and an igniter disposed within said housing proximate said ceramic block for igniting a fuel and air mixture flowing into said combustion chamber from said mixing chamber through said block whereby the temperature within said combustion chamber is heated to a temperature of at least about 575° F.

25. The catalytic converter assembly of claim 23 wherein said igniter includes a spark plug and means for activating said spark plug.

26. The catalytic converter assembly of claim 23 wherein said fuel comprises propane and said igniter includes a spark plug and means for activating said spark plug.

27. The catalytic converter assembly of claim 23 wherein said foraminous material is ceramic.

28. The catalytic converter assembly of claim 24 wherein said temperature in said combustion chamber is elevated by said heating assembly to at least about 750° F.

29. The catalytic converter assembly of claim 24 wherein said controller is adapted to be operatively coupled to the engine and is responsive to changes in the operating conditions of the engine to vary the air and/or fuel flow into said mixing chamber whereby the temperature within said combustion chamber can be varied in response to said operating conditions.

30. An exhaust purification system for use with a diesel or other compression ignited engine to remove particulate and gaseous pollutants from the exhaust thereof, said system comprising:
a catalytic converter assembly including a housing defining an exhaust inlet and an exhaust outlet, an oxidizing catalytic element disposed within said housing between said inlet and said outlet such that upon communicating said inlet with the engine exhaust, the exhaust passes through said housing about said catalytic element and outwardly therefrom through said exhaust outlet, a heating assembly associated with said housing for heating the exhaust flowing through said housing between said inlet and said catalytic element to a temperature sufficient to initiate a catalytic reaction between the exhaust and said catalytic element and to incinerate particulate pollutants in the exhaust prior to said particulate pollutants contacting said catalytic element;

a first conduit;

a plurality of gas cooling elements communicating with the exhaust outlet in said housing of said catalytic converter assembly via said first conduit, said elements reducing the temperature of the exhaust passing from said exhaust outlet in said catalytic converter assembly to about 100° F.; and a second conduit communicating with said gas cooling elements and directing the cooled exhaust from said cooling elements back to the engine for combustion therein.

31. The exhaust purification system of claim 30 including a valve assembly communicating with said second conduit for injecting a calculated volume of air into said second conduit whereby the oxygen level in the exhaust passing through said second conduit to the engine is elevated, and a regulator operatively connected to said valve assembly for controlling the volume of injected air.

32. The exhaust purification system of claim 30 wherein one or more of said gas cooling devices causes the exhaust passing therethrough to expand to effect cooling of the exhaust and condensation of water vapor therein and including a collector for condensed water vapor and a conduit for directing the condensed water vapor from said system.

33. The exhaust purification system of claim 30 wherein said heating assembly provides one or more flames within said housing for igniting gaseous pollutants in the exhaust and raising the temperature in said housing between said inlet and said catalytic element to enhance the efficiency of said heating element.

34. The exhaust purification system of claim 30 wherein said oxidizing catalytic element comprises pellets containing palladium.

35. The exhaust purification system of claim 30 wherein said heating assembly includes an infrared heat generating element formed of a foraminous material defining a plurality of small passageways therein communicating with an interior portion of said housing between said exhaust inlet and said catalytic element, a pressurized source of fuel communicating with said interior portion of said housing through said passageways and an igniter proximate said heat generating element for igniting the fuel passing therethrough.

36. The exhaust purification system of claim 30 wherein said igniter includes a spark plug and means for activating said spark plug.

37. The exhaust purification system of claim 30 wherein said fuel comprises propane and said igniter includes a spark plug and means for activating said spark plug.

38. The exhaust purification system of claim 30 wherein said foraminous material is ceramic.

39. The exhaust purification system of claim 33 wherein said oxidizing catalytic element comprises a bed of pellets containing palladium.

40. The exhaust purification system of claim 35 wherein said oxidizing catalytic element comprises a bed of pellets containing palladium.

41. An exhaust purification system for use with a diesel or other compression ignited engine to remove particulate and gaseous pollutants from the exhaust thereof, said system comprising:

a catalytic converter assembly including a housing defining an exhaust inlet and an exhaust outlet, an oxidizing catalytic element disposed within said housing between said inlet and said outlet such that upon communicating said inlet with the engine exhaust, the exhaust passes through said housing about said catalytic element and outwardly therefrom through said exhaust outlet, a heating assembly associated with said housing for heating the exhaust flowing through said housing between said inlet and said catalytic element to a temperature sufficient to initiate a catalytic reaction between the exhaust and said catalytic element and to incinerate particulate pollutants in the exhaust prior to said particulate pollutants contacting said catalytic element;

a first gas cooling element communicating with the exhaust outlet in said housing of said catalytic converter assembly for reducing the temperature of the exhaust passing therethrough;

a second cooling element communicating with said first element for further cooling the exhaust passing from said exhaust outlet in said catalytic converter assembly;

a third cooling element communicating with said second cooling element for further cooling the exhaust passing therethrough;

a filter element disposed between and communicating with two of said cooling elements for removing gaseous and particulate pollutants from the exhaust; and a conduit communicating one of said cooling or filtering elements and directing the cooled and filtered exhaust back to the engine for combustion therein.

42. The exhaust purification system of claim 41 including a valve assembly communicating with said conduit for injecting a calculated volume of air into said conduit whereby the oxygen level in the exhaust passing through said conduit to the engine is elevated, and a regulator operatively connected to said valve assembly for controlling the volume of injected air.

43. The exhaust purification system of claim 41 wherein one or more of said cooling elements causes the exhaust passing therethrough to expand to effect cooling of the exhaust and condensation of water vapor therein and including a collector for condensed water vapor and a conduit for directing the condensed water vapor from said system.

44. The exhaust purification system of claim 41 wherein said heating assembly provides one or more flames within said housing for igniting gaseous pollutants in the exhaust and raising the temperature in said housing between said inlet and said catalytic element to enhance the efficiency of said heating element.

45. The exhaust purification system of claim 41 wherein said oxidizing catalytic element comprises pellets containing palladium.

46. The exhaust purification system of claim 41 wherein said heating element heats said exhaust to a temperature of at least about 575° F.

47. The exhaust purification system of claim 41 wherein said heating element heats said exhaust to a temperature of at least about 750° F.

48. The exhaust purification system of claim 41 wherein said first cooling element comprises an elongated metal tubular member defining a plurality of coils therein.

49. The exhaust purification system of claim 41 wherein said heating assembly includes an infrared heat generating element formed of a foraminous material defining a plurality of small passageways therein communicating with an interior portion of said housing between said exhaust inlet and said catalytic element, a pressurized source of fuel communicating with said interior portion of said housing through said passageways and an igniter proximate said heat generating element for igniting the fuel passing therethrough.

50. The exhaust purification system of claim 41 wherein said igniter includes a spark plug and means for activating said spark plug.

51. The exhaust purification system of claim 44 wherein said oxidizing catalytic element comprises pellets containing palladium.

52. The exhaust purification system of claim 48 wherein said second cooling element comprises a housing having an inlet and an outlet and containing a supply of cooling liquid therein, said tubular member extending through said inlet and into said cooling liquid and wherein said outlet communicates with said third cooling element.

53. The exhaust purification system of claim 49 wherein said heating element heats said exhaust to a temperature of at least about 575° F.

54. The exhaust purification system of claim 49 wherein said heating element heats said exhaust to a temperature of at least about 750° F.

55. The exhaust purification system of claim 49 wherein said foraminous material is ceramic.

56. The exhaust purification system of claim 49 wherein said passageways are configured to generate infrared wave patterns.

57. The exhaust purification system of claim 52 wherein said tubular member of said first cooling element defines an extended end disposed within the liquid in said second cooling element and a plurality of apertures therein proximate said end for dissipating the exhaust flowing therethrough into said cooling liquid and wherein said inlet of said housing is in sealing engagement with said tubular member.

58. The catalytic converter assembly of claim 1 or 2 or 22 wherein said heating assembly includes a control system for selectively shutting off said heating assembly after catalytic reaction in said second chamber has stabilized.

* * * * *